United States Patent [19]
Fredriksson

[11] Patent Number: 5,765,891
[45] Date of Patent: Jun. 16, 1998

[54] LIFTING HOOK

[75] Inventor: Lars Fredriksson, Åkersberga, Sweden

[73] Assignee: Frenolink Aktiebolag, Akersberga, Sweden

[21] Appl. No.: 771,056

[22] Filed: Dec. 20, 1996

[30] Foreign Application Priority Data

Dec. 22, 1995 [SE] Sweden ............................ 9504636

[51] Int. Cl.⁶ .................................................. B66C 1/14
[52] U.S. Cl. ........................ 294/82.11; 24/116 R; 59/93; 294/82.1
[58] Field of Search .................... 294/74, 75, 82.1, 294/82.11, 82.12, 82.14, 82.17, 82.19–82.23; 24/68 CT, 116 R, 598.3, 598.4, 598.7, 599.1, 600.4, 600.5; 59/85, 86, 93

[56] References Cited

U.S. PATENT DOCUMENTS

| 1,179,951 | 4/1916 | Moore . | |
| 2,630,610 | 3/1953 | Lock . | |
| 3,729,926 | 5/1973 | Buske | 294/82.1 X |
| 3,863,441 | 2/1975 | Kaufmann | 294/82.1 X |
| 4,121,867 | 10/1978 | Muller | 294/82.17 |
| 5,173,998 | 12/1992 | Mackenzie | 294/82.1 X |

FOREIGN PATENT DOCUMENTS

| 541069 | 7/1922 | France . |
| WO96/00861 | 1/1996 | WIPO . |

Primary Examiner—Johnny D. Cherry
Attorney, Agent, or Firm—Quarles & Brady

[57] ABSTRACT

A lifting hook with a hook body (110) and a shank (112), which has a slot (116) with an anchoring member (101) and a bridge portion (115). The lower part of a hoisting chain can be secured to the hook by coupling the end link (51) of the hoisting chain to the anchoring member (101) and inserting a supporting link (52) into the slot adjacent to the bridge portion (115) and to form a loose, non-loaded loop of the hoisting chain between an adjoining engagement link (53) and the anchored end link (51).

18 Claims, 11 Drawing Sheets

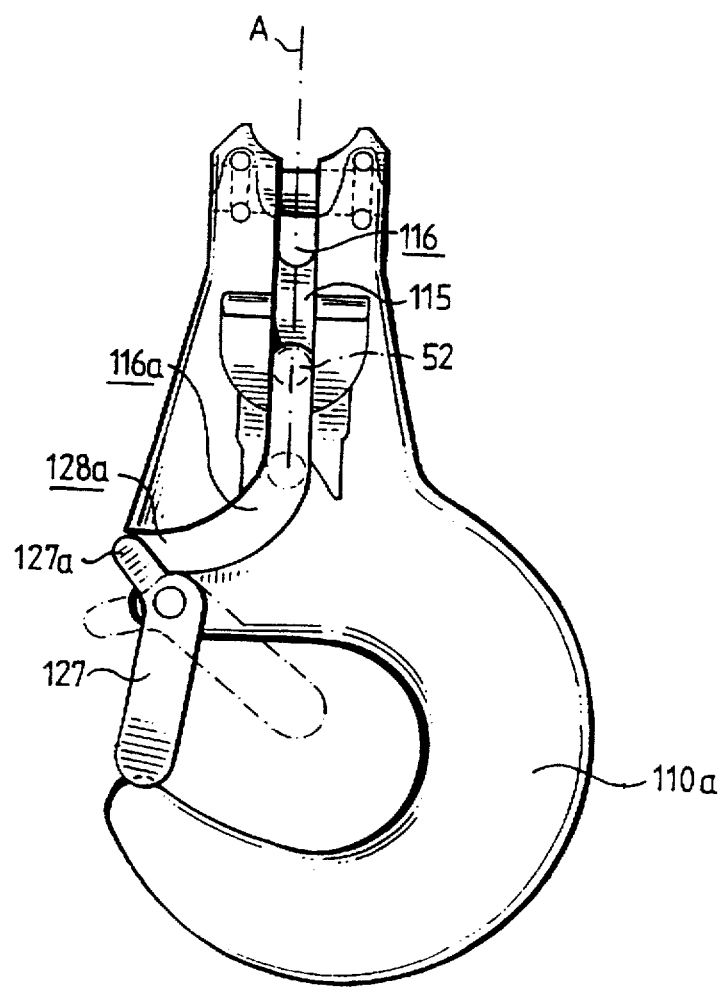

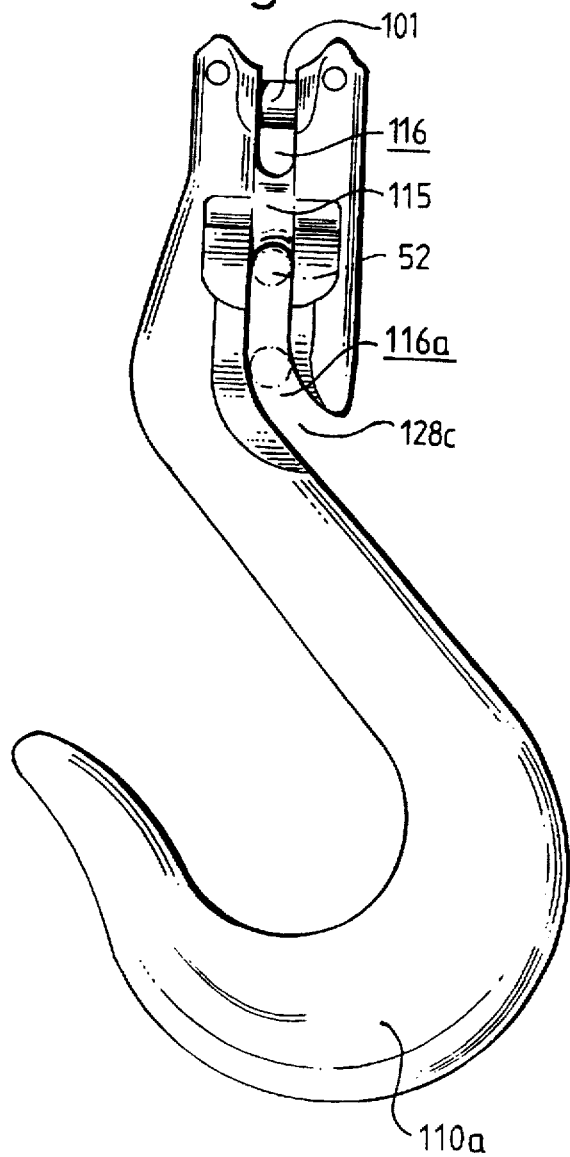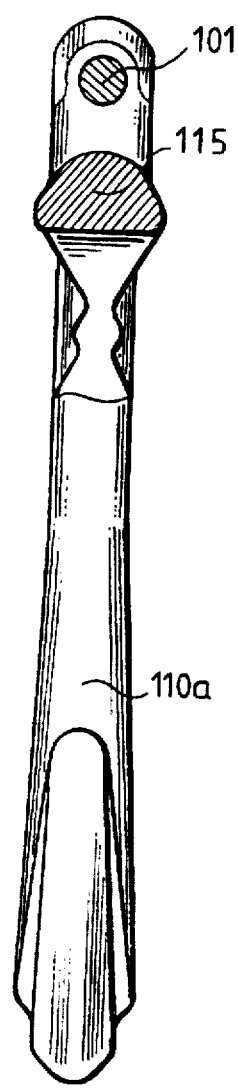

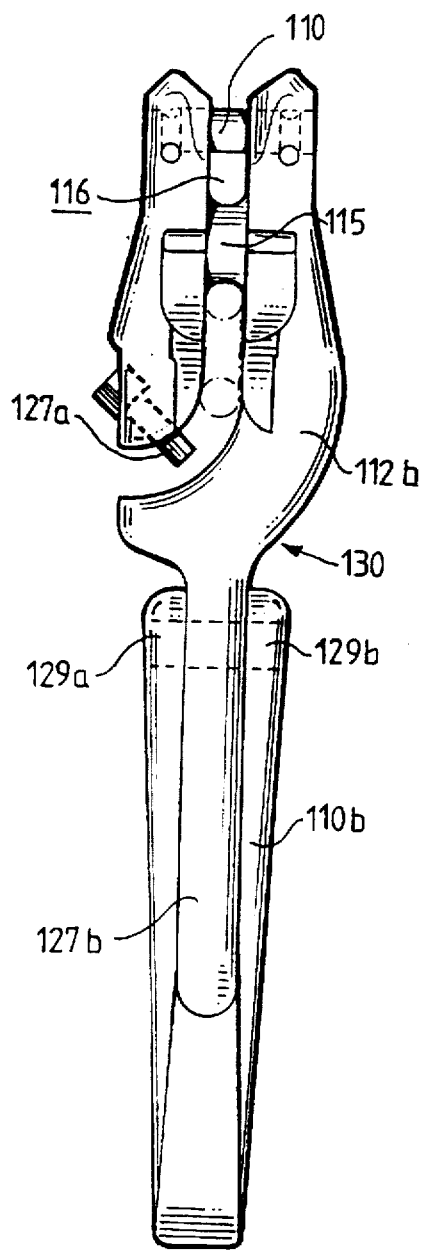
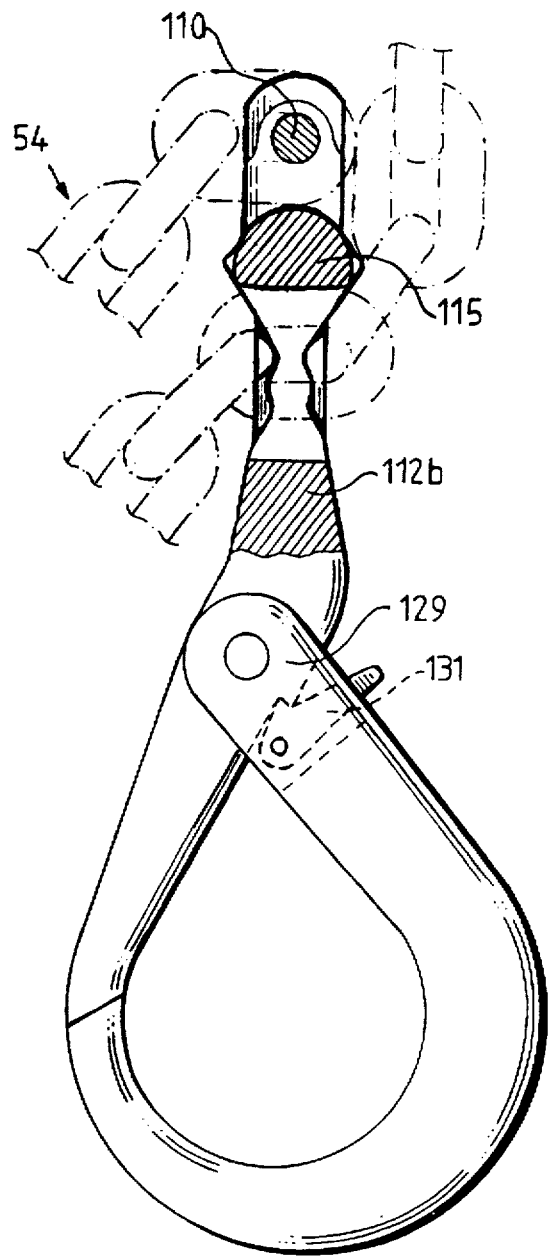
Fig. 4
Fig. 4a

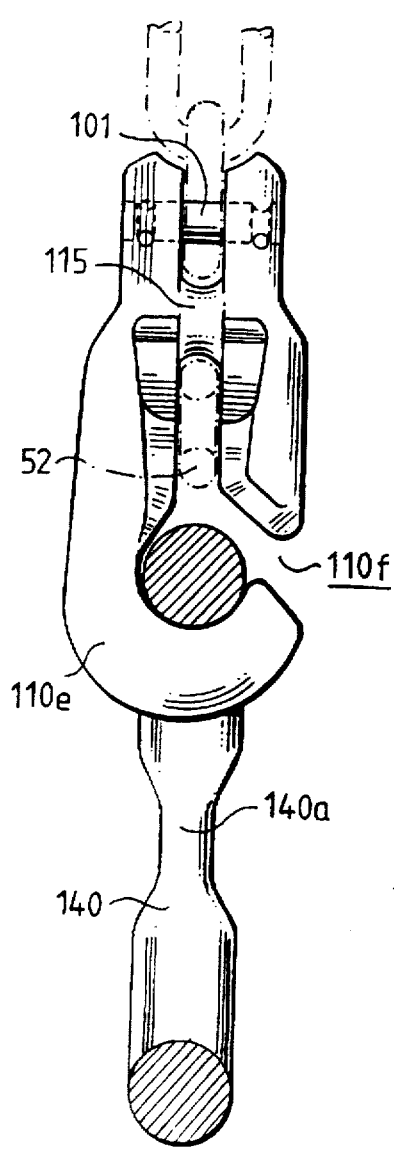
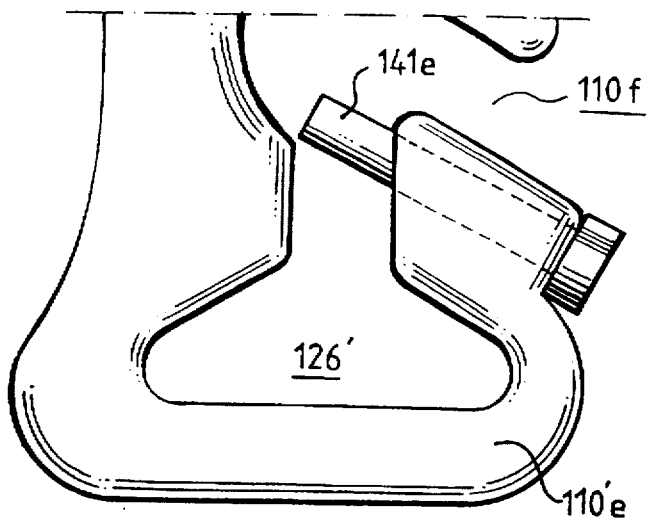
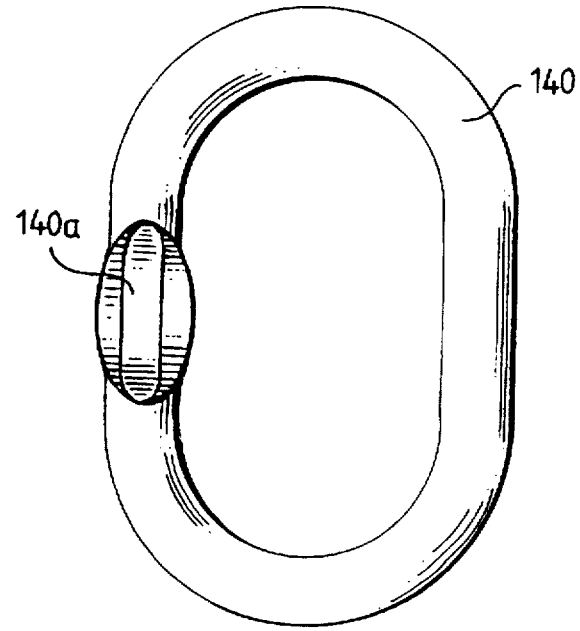

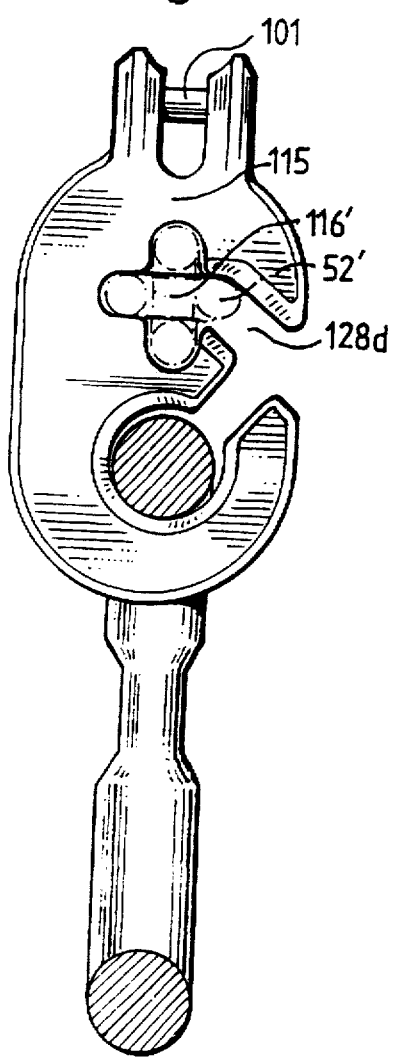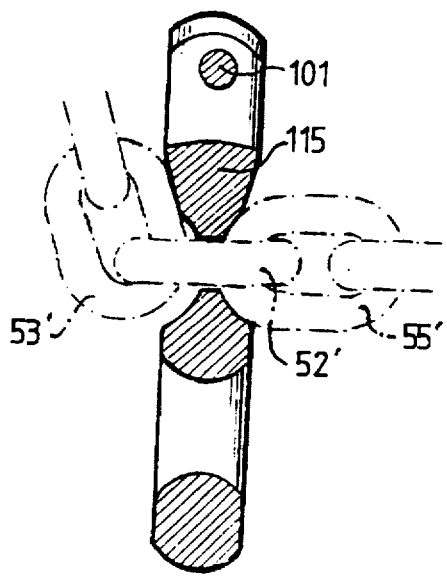

LIFTING HOOK

FIELD OF THE INVENTION

The present invention relates to a lifting hook with a lower hook body for carrying a load and an upper shank for suspending the lifting hook at the lower end portion of a hoisting chain, a hook opening being defined between the shank and an end of the hook body, and the shank being formed with two substantially parallel shank portions defining a slot therebetween, the slot being dimensioned to accommodate one of the links of said hoisting chain, said one link being located in a central position in the slot and the adjacent parts of the shank portions being provided with recessed seating surfaces for engagement with an engagement link adjoining said centrally located link of the hoisting chain.

PRIOR ART

Such a lifting hook is previously known from the French patent specification 541.069 (Yseboodt, published in 1922). The shank of this hook is formed as a casing with walls surrounding a pocket, except for the region of the slot, so as to enclose an engagement link of the hoisting chain. In its engaging position, during use of the lifting hook, the engagement link is securely held in place in the pocket (having the recessed seating surfaces referred to above). Also, it is easy to detach the hoisting chain from the lifting hook and/or to shorten or lengthen the hoisting chain by inserting one of the other links as an engagement link into the engagement pocket. Such an operation is facilitated by the fact that the adjoining centrally located link, oriented flatwise in the slot, can easily be swung away from its normal, vertical position into a horizontal position in which it can slide along the slot without the next adjoining link interfering with the shank casing.

A similar device, although with a separate chain coupling member connected to the shank of the lifting hook by means of swivel coupling device, is disclosed in U.S. Pat. No. 2,630,610 (Yale & Towne, issued in 1953).

In both of the prior art devices, the engagement pocket casing is a rather clumsy and heavy part of the hook assembly which is complicated and expensive to manufacture. Also, in the hook according to the above-mentioned French patent, the chain links hanging down from the engagement link tend to interfere with the interior of the hook body (where the load is carried).

SUMMARY OF THE INVENTION

The main object of the present invention is to accomplish a simpler device which is lighter in weight and which can be manufactured at low cost while retaining the basic functional features, i.e. a secure suspension and an easy change of the effective length of the hoisting chain at the shank of the lifting hook. Moreover, the interior of the hook body should be kept free.

According to the invention, this object is achieved for a lifting hook having the structural features mentioned in the opening paragraph and being further characterized in that

- a bridge portion of said shank extends across said slot between said shank portions so as to connect the two shank portions to each other and to divide the slot into an upper slot part and a lower slot part;
- the upper slot part is provided with an anchoring member extending transversely between the two shank portions for securely anchoring an end link of the hoisting chain to the shank of the hook;
- the lower slot part has an insertion opening, into which a desired link of said hoisting chain can be inserted and be displaced into said centrally located position adjacent to said bridge portion; and
- said recessed seating surfaces are located at the lower slot part adjacent to said bridge portion and are oriented so that the engagement link, when engaging said recessed seating surfaces, projects transversely away from the upper shank so as to form a loose, non-loaded loop of the hoisting chain between said anchored end link and said engagement link.

Thus, in the lifting hook according to the invention, the shank has no casing forming an enclosing pocket, but only a throughgoing slot and a bridge portion extending across the slot so as to guide and possibly also support the centrally located link. This link, which is located in the lower part of the slot, is held securely in position by means of the adjoining engagement link. Since the engagement link extends transversely away from the upper shank of the lifting hook, the associated non-loaded chain loop is held away from the interior of the hook body and will not interfere therewith.

The desired link, selected so as to obtain a certain effective length of the hoisting chain, can easily be inserted sideways into the insertion opening of the lower part of the slot. This insertion opening can be located either at the inside of the hook or at the shank thereof. In a possible improvement, the supporting link can be locked within the lower part of the slot by means of a locking member, which is either a separate member or a part of a pivotable lever adapted to close the hook opening.

These and other advantageous features are stated in the dependant claims and will also appear from the detailed description below explaining the invention by way of preferred embodiments, reference being made to the appended drawings.

BRIEF DESCRIPTION OF THE DRAWINGS

FIG. 3 is a side view of a second embodiment of the lifting hook according to the invention;

FIG. 3a is a side view of a third embodiment of the lifting hook according to the invention;

FIG. 3b is a front view, partially in section, of the hook shown in FIG. 3a;

FIG. 4 is a front view of fourth embodiment of the lifting hook according to the invention;

FIG. 4a is a side view of the hook shown in FIG. 4;

FIG. 7 is a side view of a sixth embodiment of the lifting hook, and an associated coupling link (the latter shown in a sectional view);

FIG. 7a is a side view of the coupling link shown in FIG. 7;

FIG. 7b is a side view corresponding to FIG. 7 indicating a modified embodiment of the lifting hook and an associated coupling link;

FIG. 7c is a sectional view of the lifting hook shown in FIG. 7b;

FIGS. 8a, 8b, 8c, 8d and 8e are detailed views of the lower hook body of the lifting hook shown in FIG. 7, with various embodiments of locking means in the hook opening.

DETAILED DESCRIPTION OF PREFERRED EMBODIMENTS

Figure 1:
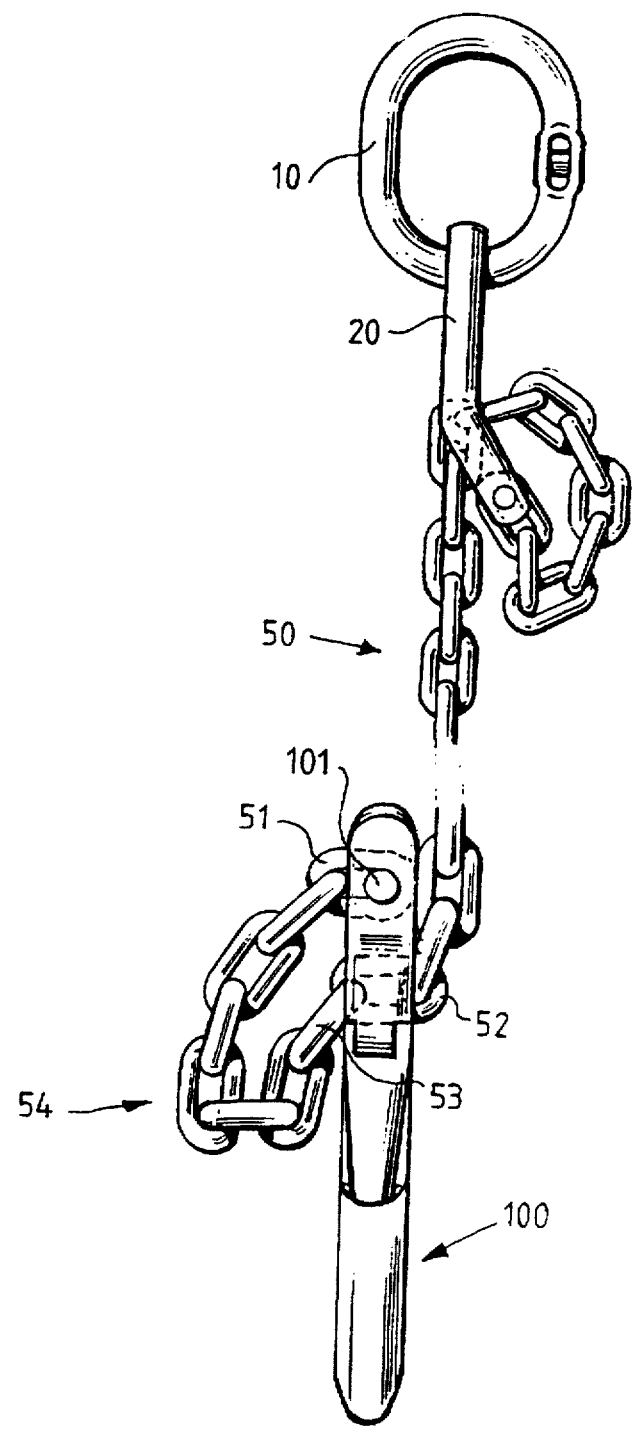
FIG. 1 is a side view of a hoisting chain carrying at its lower end portion a lifting hook according to the invention.

The assembly shown in FIG. 1 includes a lifting hook 100 suspended at the lower end portion of a hoisting chain 50, the upper end portion of which is coupled and anchored to a coupling link 20, which in turn is connected to an oval ring 10, e.g. connected to a chain, a lifting strap or a hook hanging down from a crane, an overhead crane or some other lifting device. The coupling link 20 is of the kind described in PCT/SE95/00766 (Fredriksson) which enables a convenient shortening or lengthening of the effective length of the hoisting chain by adjustment at its upper end.

The lifting hook 100 according to the present invention is designed so as to enable a corresponding adjustment of the effective length of the hoisting chain 50 at its lower end portion, i.e. at the hook itself. Of course, it is advantageous to make such adjustments when handling a load so as to ensure a proper height of the lifting hook above the load in view of the particular circumstances. As appears from FIG. 1, the lower end link 51 is permanently connected to an anchoring pin 101 of the hook 100 whereas a selected supporting link 52 carries the hook in combination with an adjoining engagement link 53, so that a loose, non-loaded loop 54 of the hoisting chain is hanging freely at the side of the lifting hook 100.

Figure 2:
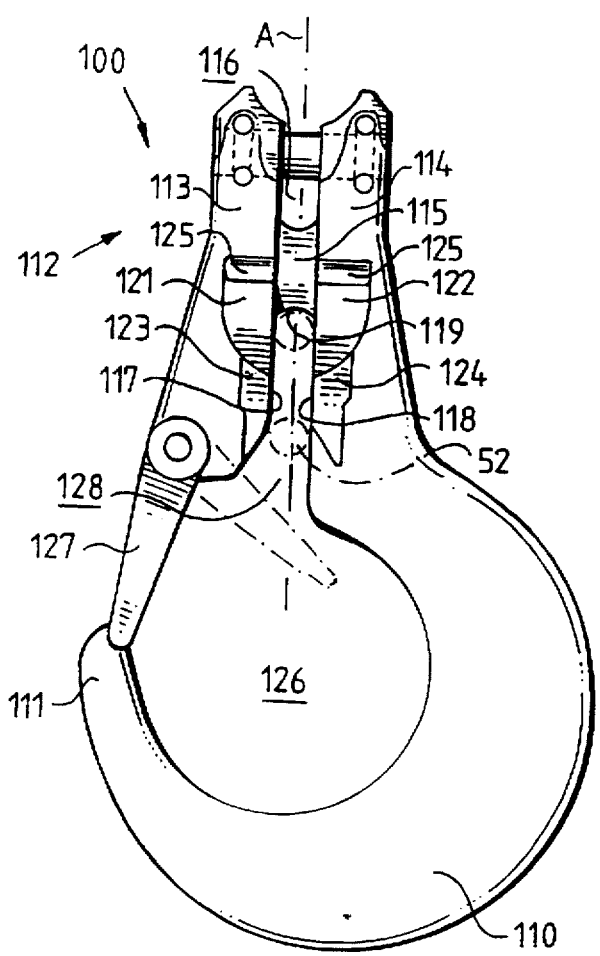
FIG. 2 is a side view of the lifting hook as such (without the hoisting chain)
Figure 2A:
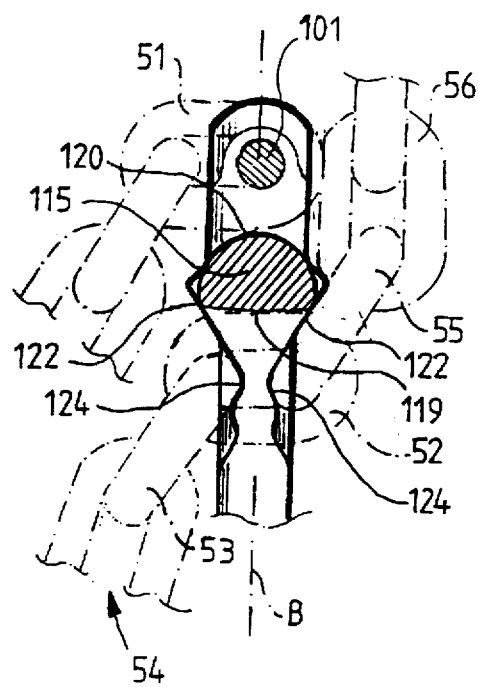
FIG. 2a is a detailed sectional view of the shank, along the plane A in FIG. 2.

The structure of the hook 100, and its connection to the links of the hoisting chain 50, is illustrated in FIGS. 2 and 2a. The lifting hook 100 comprises a lower hook body 110, which is curved approximately like a circular arc and tapers towards its free end 111, and an upper shank 112, which is formed with two substantially parallel shank portions 113 and 114 extending in a generally vertical direction (when the hook is upright as shown).

The two shank portions 113,114 are held securely fixed at a mutual distance by means of a supporting bridge portion 115, preferably forged in one piece integrally with the rest of the hook, including the shank portions 113,114 and the hook body 110. The mutual distance is such as to define a vertically extending slot 116 therebetween, with substantially planar inner surfaces 117 and 118, respectively, and dimensioned to correspond essentially to the material thickness of the links of the hoisting chain and to accommodate a centrally located, flatwise oriented chain link, in particular the above-mentioned supporting link 52, with some play between the inner surfaces 117,118.

In the position shown in FIGS. 1,2 and 2a, the supporting link 52 is oriented with its longitudinal axis in a substantially horizontal direction and its main plane in a vertical plane (coinciding with the central plane A of the slot 116) while supporting, with its upper longitudinal side surface, the horizontal lower surface 119 of the bridge portion 115. For this purpose, the lower surface 119 is straight in a direction perpendicular to the main plane B of the hook 100 and concavely curved in this plane B.

As appears from FIG. 2a, the bridge portion 115 is slightly wider than the shank portions 113,114 (in the plane A) and is curved approximately as a half circle at its upper surface 120. The dimensions are such that the link 56 oriented in the plane A on the hoisting side can be accommodated with its lower end close to the shank and standing almost upright. The link 55 between the upright link 56 and the horizontal supporting link 52 is obliquely oriented while making contact with inclined lateral support surface portions 121,122 at the sides of the shank portions 113,114. The lower ends of these support surface portions 121,122 merge with curved, recessed seating surfaces 123,124, which engage with the end portion of the engagement link 53 adjoining the supporting link 52 at the non-loaded side of the hoisting chain 50 (to the left in FIG. 2a) and accommodate the lower end portion of the obliquely oriented link 55 (to the right in FIG. 2a). The inclined lateral support surface portions extend upwardly somewhat above the lower surface 119 of the bridge portion 115 where they form laterally extending lugs 125.

As shown in FIG. 2a, the engagement link 53 projects transversely away from the upper shank 112, whereby the non-loaded loop 54 (compare FIG. 1) is held freely at the side of the hook body 110 and does not interfere therewith.

In the embodiment illustrated in FIGS. 1,2 and 2a, the slot 116 between the shank portions 113, 114 is substantially straight and extends downwardly in the vertical plane A and opens into the central space 126 of the hook body 110 at the inside of a pivotable closure member 127. The latter is journalled at the shank portion 113 and is adapted to close the mouth or opening of the hook when being moved from a retracted position (shown with dash-dotted lines) to a closing position.

When the effective length of the hoisting chain 50 is to be adjusted, a desired supporting link 52 is placed into the central space 126 of the hook body and is inserted sideways into the opening 128 of the slot 116. Then, it is slid into the central position shown in FIGS. 2 and 2a abutting the underside 119 of the bridge portion 115.

During such an adjustment procedure, as well as during normal use, it is a great advantage that the end link 51 of the hoisting chain is permanently coupled to the anchoring pin 101 at the top of the shank 112 of the hook 100. There is no risk of losing the lifting hook when manually handling the lifting hook or when lowering the hoisting chain so that the load rests on a supporting surface.

In the embodiment shown in FIG. 3, the lower part of the slot 116 has a vertical portion situated immediately below the bridge portion 115, for accommodating the supporting chain link 52 in a centrally located position, and a curved portion 116a extending away from the vertical plane A into an insertion opening 128a at the front of the hook body 110a above the pivotable closure member 127. This lever 127 has a second, upper, relatively short arm 127a adapted to close the insertion opening 128a and, consequently, to lock in the supporting link 52 in the lower part of slot 116 when the closure member 127 closes the hook opening. On the other hand, when the closure member is retracted to its releasing position (shown with dash-dotted lines in FIG. 3), the short arm 127a will swing away from the insertion opening 128a so as to enable adjustment of the effective length of the hoisting chain 50.

FIGS. 3a and 3b show a third embodiment (without closure member) having a lower part of the slot 116 which is curved backwards at the back of the hook body 110a. Thus, in this case, the insertion opening 128c is located at the back portion of the shank. The rear surface of the hook body merges smoothly with the lower part 116a of the slot and the associated recessed seating surfaces with which the engagement link engages.

FIGS. 4 and 4a show a fourth embodiment of the lifting hook. As is previously known per se, the hook body 110b has an upper fork-like end portion 129 with two side parts 129a, 129b, between which a lever 130 with two arms is pivotably journalled. The upper arm 112b constitutes the shank of the hook, whereas the lower arm 127b forms a closure member for closing the hook opening. The lever 130 can be locked in closing position by means of a latch member 131 biassed by a spring (not shown).

The shank 112b is constructed in the same way as the shank of the hooks of FIGS. 3, 3a and 3b, i.e. with a slot 116 being curved at its lower part. In this case, however, the insertion opening 128b is located at the lateral side of the hook. Furthermore, the locking member adapted to obstruct the lower part of the slot 116 is constituted by a separate member 127c in the form of a pin, which is axially movable transversely to the slot and is biassed to the illustrated locking position by means of a spring (not shown).

Figure 5:
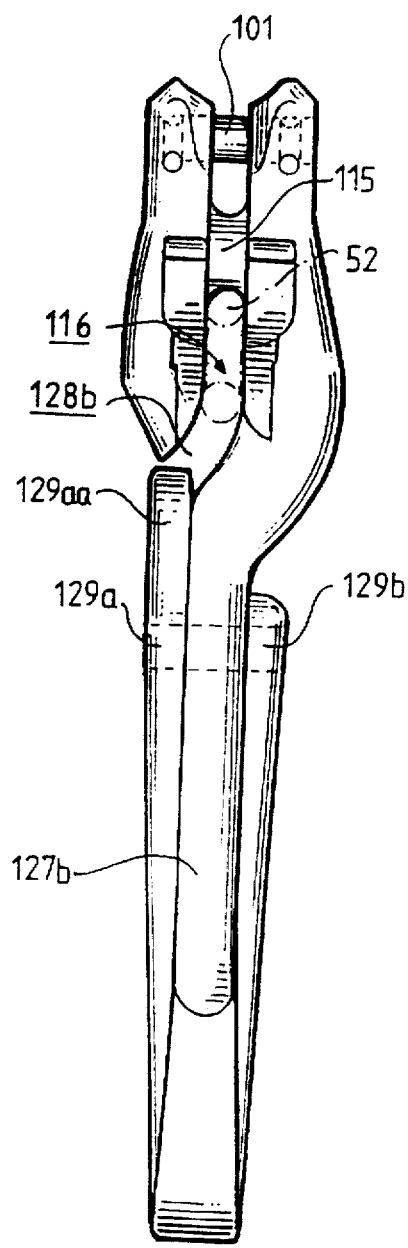
FIGS. 5 and 5a are views, corresponding to FIGS. 4 and 4a, of a slightly modified version of the fourth embodiment of the lifting hook according to the invention.
Figure 5A:
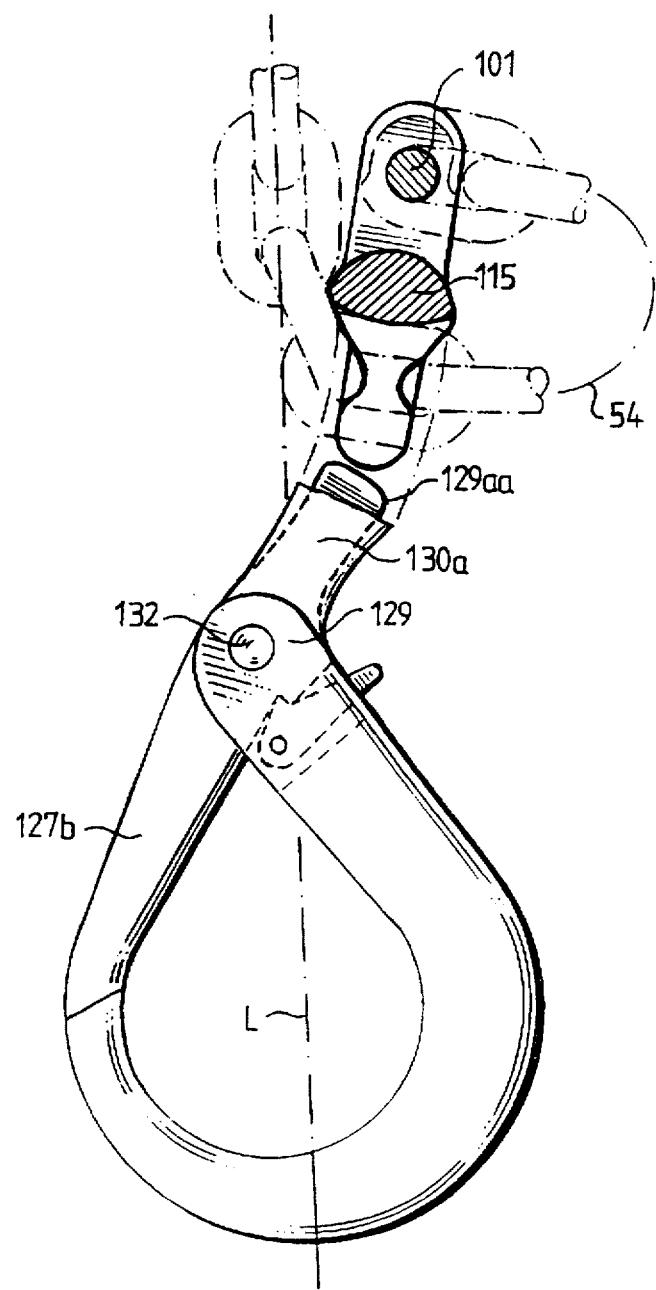

In a modified version of the fourth embodiment, shown in FIGS. 5 and 5a, one of the side parts of the fork-like portion 129, namely the side part 129a (to the left in FIG. 5), is extended upwards so as to form a protrusion 129aa which serves as the locking member obstructing the lower part of the slot 116, in the region of the insertion opening 128b, when the closure member 127b closes the hook opening.

In this modified third embodiment, as appears clearly from FIG. 5a, the lever 130a is slightly bent in an opposite direction, as compared to the embodiment shown in FIG. 4a, so that the pivot axis 132 is located at some distance from the load line L indicated in FIG. 5a. In particular, the supporting bridge portion 115 of the shank and the pivot axis 132 are located on opposite sides of the load line L, whereby the closure member 127b will tend to close the hook opening when the lifting hook is being loaded. This is true even if the non-loaded loop 54 of the hoisting chain is located at the back side of the hook (to the right as shown in FIG. 5a instead of to the left as shown in FIG. 4a).

Figure 6:
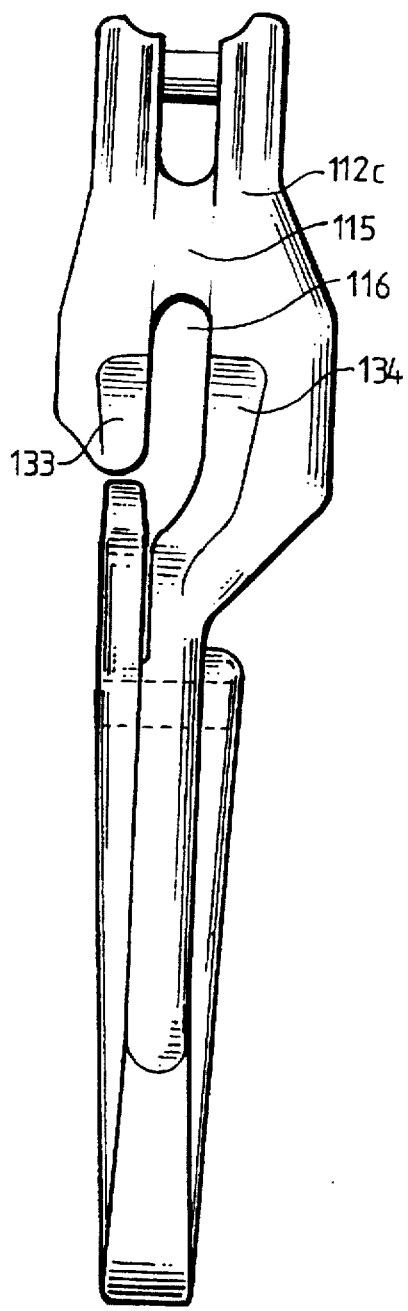
FIGS. 6 and 6a are views, corresponding to FIGS. 4 and 4a, of a fifth embodiment of the lifting hook according to the invention.
Figure 6A:
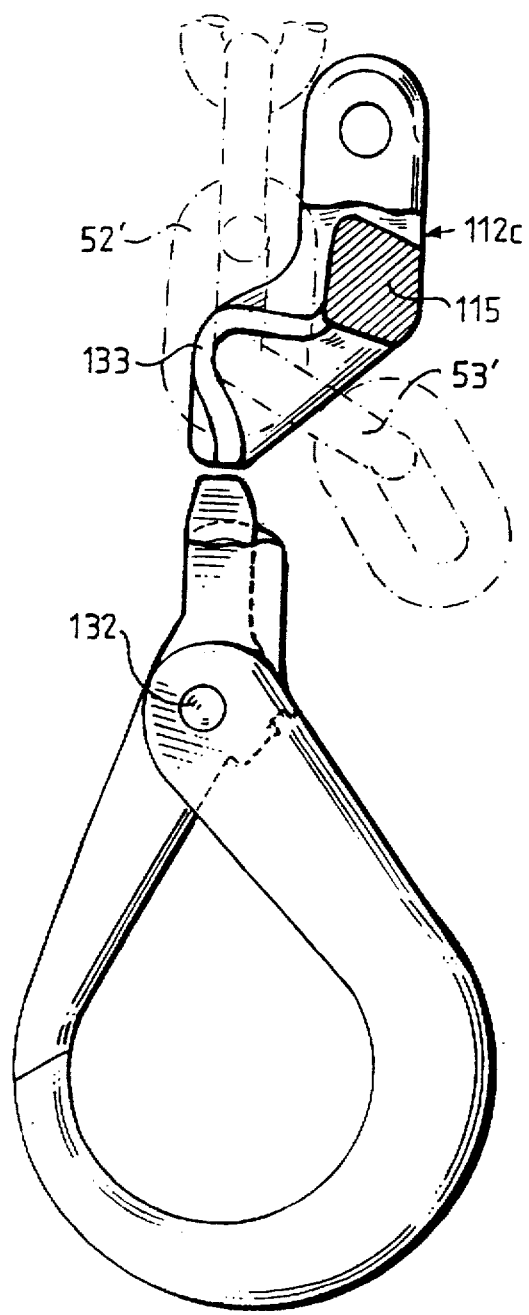

The fifth embodiment of the lifting hook shown in FIGS. 6 and 6a differs from the preceding embodiment in that the shank 112c projects at an angle away from the longitudinal direction of the part of the shank situated immediately above the pivot axis 132. In the outwardly (or backwardly) projecting part of the shank 112c, on both sides of the central slot 116, below the transversely extending bridge portion 115, the shank portions are provided with strongly curved seating surfaces 133, 134 for engagement with an obliquely oriented engagement link 53', as illustrated in FIG. 6a. In this case, the adjoining supporting link 52' is positioned with its longitudinal axis direction oriented vertically (basically along the load line of the lifting hook).

The sixth embodiment of the lifting hook shown in FIG. 7 corresponds basically to the first embodiment (FIGS. 1, 2 and 2a). However, the hook body 110e is dimensioned to receive and support a coupling link 140, which in turn may carry a chain or some other lifting means. As appears from FIGS. 7 and 7a, the cross-section of the coupling link 140 is wider than the hook opening. However, the coupling link has a narrow portion 140a, which is flat and slightly wider so as to fit snugly into the hook opening 110f.

The hook opening 110f also constitutes an insertion opening for the supporting link 52 of the upper hoisting chain. Thus, before insertion of the coupling link, the supporting chain link can be introduced sideways and be displaced into the central position shown in FIG. 7, where it is oriented with its longitudinal axis in a horizontal direction and supports the bridge portion 115 of the shank in the same way as the embodiment shown in FIGS. 1, 2 and 2a. Thus, a non-loaded shortening loop is provided.

Thereafter, upon insertion of the coupling link 140 into the interior of the hook body 110e, as shown in FIG. 7, the supporting link 52 is locked in its supporting position and cannot be removed until the coupling link 140 is taken out.

If necessary, the hook shown in FIG. 7 may be equipped with a separate locking member, e.g. in the form of a spring-biassed pin, for locking in the coupling member 140 and/or the supporting link 52 of the hoisting chain.

In the modified embodiment shown in FIG. 7b, the lower slot part 116' below the bridge portion 115 is oriented differently, i.e. horizontally and transversely in relation to the central vertical plane in which the upper slot part extends. Consequently, upon inserting the desired link 52' sideways into the insertion opening 128d, the link 5' will be positioned centrally below the bridge portion 115 with its extension plane oriented horizontally. Of course, the adjacent chain links 53' and 55' will then be oriented in a vertical plane while engaging with concavely curved seating surfaces at each side of the slot (see FIG. 7c).

Figure 8A:
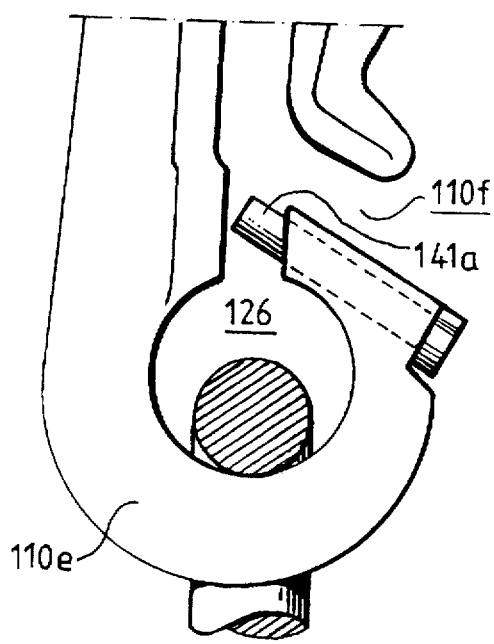

In FIG. 8a, the locking pin 141a is disposed in parallel to the hook opening 110f and is adapted to close the central space 126 of the hook body in its locking position (as shown).

Figure 8B:
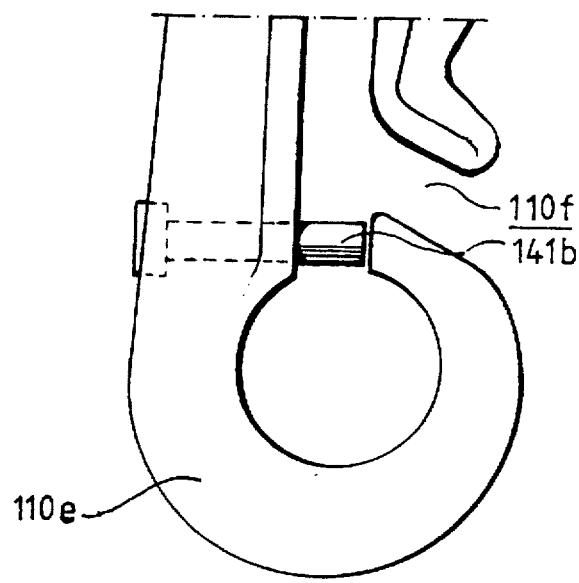

In FIG. 8b, the locking pin 141b is mounted at the lower end of the hook shank adjacent to the opening 110f.

Figure 8C:
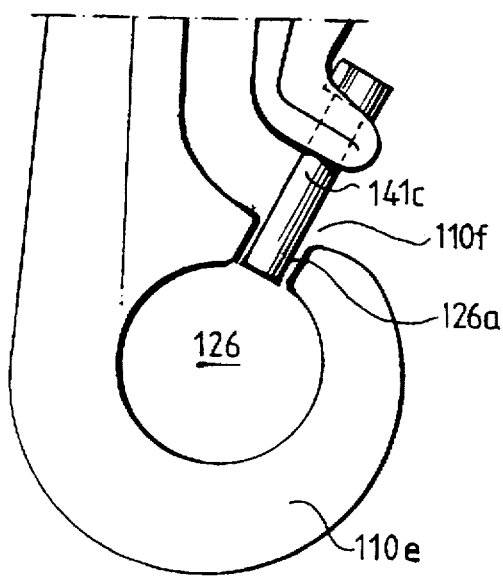

In the embodiment of FIG. 8c, the locking pin 141c is oriented with its longitudinal axis directed towards the centre of the central opening 126 and is co-axial with the interior opening 126a leading into the central opening 126.

Figure 8D:
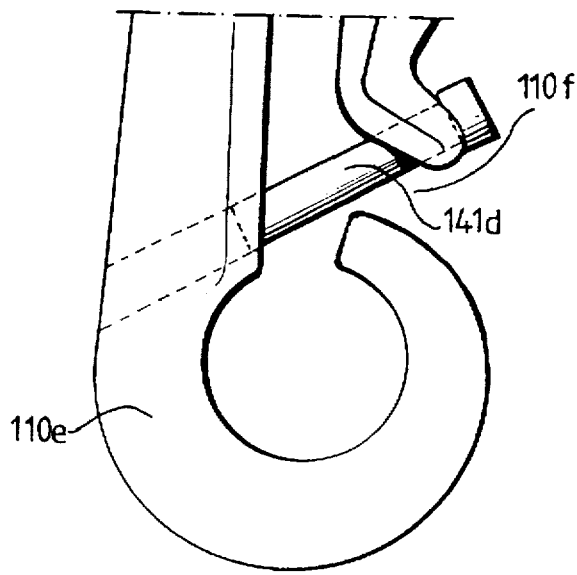

In FIG. 8d, the locking pin 141d is mounted in the back portion of the hook body 110e and extends, in its locking position, all the way to the opposite lower end of the shank so as to obstruct the hook opening as well as the interior opening leading into the central opening 126.

Finally, in FIG. 8e, the locking pin 141e is mounted in the same way as in FIG. 8a. In this case, however, the hook body 110'e is shaped so to form a wide central opening 126' adapted to receive a flat hoisting strap, e.g. of synthetic fiber material.

Figure 9:
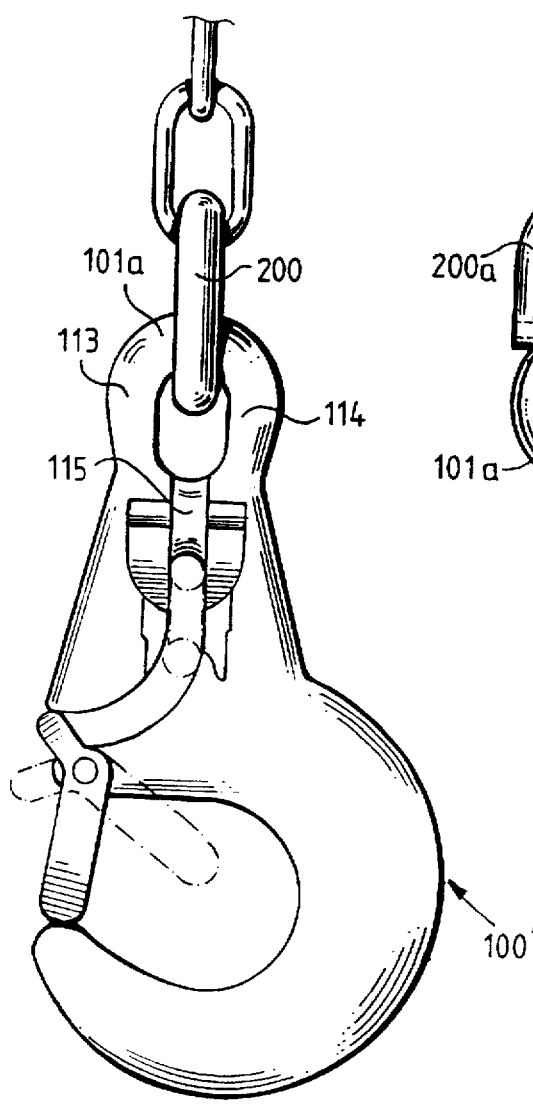
FIGS. 9, 9a and 9b illustrate a seventh embodiment with a closed eye portion at the upper end of the hook.
Figure 9A:
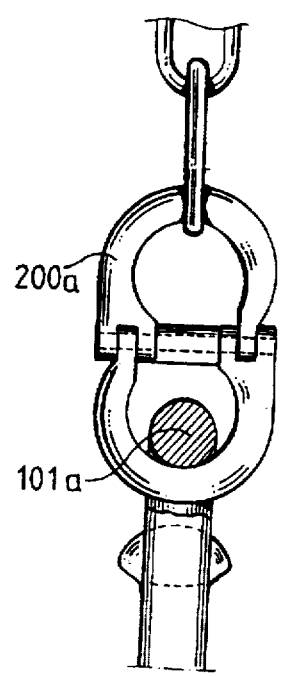
Figure 9B:
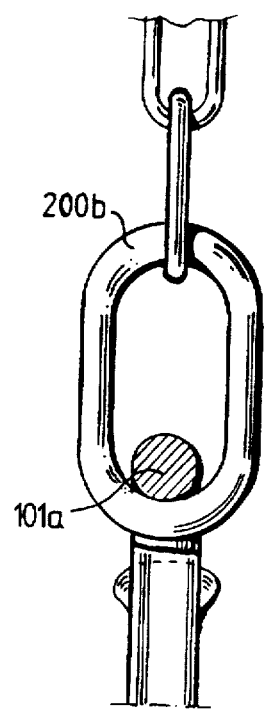

In all of the embodiments described above, the anchoring member for permanently connecting the end link of the hoisting chain to the upper shank of the lifting hook is constituted by a pin 101 extending transversely between the two shank portions. As an alternative, the upper end of the shank of the lifting hook may be formed as a closed loop portion or an eye 101a forged in one piece with the two shank portions 113, 114. Such an alternative, seventh embodiment of the lifting hook 100' is illustrated in FIGS. 9, 9a and 9b. The shank portions 113, 114 merge smoothly with the eye portion 101a. Thus, there is formed a closed eye opening defined by the upper eye portion 101a, the shank portions 113, 114 and the supporting bridge portion 115. The rest of the lifting hook is identical to the one shown in FIG. 3.

In FIG. 9, the lower end of the hoisting chain is coupled to the lifting hook 100' by means of a closed coupling link 200 which is welded so as to form a permanent connection at the time of manufacture.

Of course, it is possible to use a detactable coupling link, such as a hinged coupling link assembly 200a shown in FIG. 9a.

In case a permanent connection is to be used, a large oval ring member 200b as shown in FIG. 9b can be permanently coupled to the lower end of the hoisting chain.

I claim:

1. A lifting hook (100) with a lower hook body (110) for carrying a load and an upper shank (112) for suspending the lifting hook at the lower end portion of a hoisting chain (50), a hook opening being defined between the shank and an end of the hook body, and the shank being formed with two substantially parallel shank portions (113,114) defining a slot (116) therebetween, the slot being dimensioned to accommodate one of the links (52) of said hoisting chain, said one link being located in a central position in the slot and the adjacent parts of the shank portions being provided with recessed seating surfaces (123,124) for engagement with an engagement link (53) adjoining said centrally located link of the hoisting chain, characterized in that a bridge portion (115) of said shank (112) extends across said slot (116) between said shank portions so as to connect the two shank portions (113,114) to each other and to divide the slot into an upper slot part and a lower slot part;

the upper slot part is provided with an anchoring member (101) extending transversely between the two shank portions (113,114) for securely anchoring an end link (51) of the hoisting chain to the shank of the hook;

the lower slot part has an insertion opening (128), into which a desired link (52) of said hoisting chain can be inserted and be displaced into said centrally located position adjacent to said bridge portion; and said recessed seating surfaces are located at the lower slot part adjacent to said bridge portion and are oriented so that the engagement link, when engaging said recessed seating surfaces, projects transversely away from the upper shank so as to form a loose, non-loaded loop (54) of the hoist chain between said anchored end link (51) and said engagement link (53).

2. A lifting hook as defined in claim 1, wherein said slot (116) extends substantially in a vertical plane (A) which is perpendicular to a main plane (B), in which the hook body (110) extends, at least in the upper and lower slot parts adjacent to said supporting bridge portion (115).

3. A lifting hook as defined in claim 2, wherein the lower part of said slot (116) includes a curved portion (116a;116b), said insertion opening (128a) being located in the shank of the lifting hook.

4. A lifting hook as defined in claim 3, wherein said insertion opening (128a) is located at a front portion of the shank of the lifting hook at a distance from said hook opening.

5. A lifting hook as defined in claim 3, wherein said insertion opening (128b) is located at a side portion of the shank (112b) of the lifting hook at a distance from said hook opening.

6. A lifting hook as defined in claim 3, wherein said insertion opening (128c) is located at a back portion of the shank of the lifting hook.

7. A lifting hook as defined in claim 1, wherein said slot (116) is substantially straight, the insertion opening (128) of said lower part of the slot being located centrally (126) at the lifting hook at the inside of said hook opening.

8. A lifting hook as defined in claim 1, wherein said lower part of the slot is formed so as to accommodate said centrally located link (52) in supporting position with a longitudinal side portion thereof bearing against a lower supporting surface (119) of said supporting bridge portion (115) of the shank.

9. A lifting hook as defined in claim 1, wherein said lower part of the slot is formed in a part of the shank projecting obliquely away from a central, vertical load line of the hook, said centrally located link being oriented with its longitudinal centre line along said vertical load line and the adjoining engagement link being obliquely oriented in relation to said vertical load line.

10. A lifting hook as defined in claim 1, wherein said lower part of the slot is formed so as to accommodate said centrally located link (52') in a horizontal position below said bridge portion.

11. A lifting hook as defined in claim 1, wherein said hook opening is dimensioned to snugly receive a narrow portion of a coupling link which is insertable so as to be coupled to said hook body.

12. A lifting hook as defined in claim 11, wherein said coupling link is dimensioned to lock in said desired link upon insertion thereof into said central position and insertion of the coupling link into the hook body.

13. A lifting hook as defined in claim 1, wherein a locking member (127a,127c,129aa) is adapted to obstruct the lower part of said slot so as to lock in said flatwise oriented link (52) of the hoisting chain when the locking member is moved from a releasing position into a locking position.

14. A lifting hook as defined in claim 13, wherein said locking member is constituted by a separate member (127c).

15. A lifting hook as defined in claim 13, wherein said locking member forms a part of a pivotable lever (130) being adapted to close said hook opening when being moved into a closing position.

16. A lifting hook as defined in claims 13, wherein the shank of the lifting hook is formed by one arm (112b) of a pivotable lever (130), the other arm (127b) of which forms a closure member adapted to close said hook opening, and the central part of the lever being pivotably journalled in a fork-like end portion (129) of the hook body (110b), one side part (129a) of said fork-like end portion of the hook body constituting said locking member (129aa) for obstructing the lower part of said slot (116).

17. A lifting hook as defined in claim 1, wherein said anchoring member includes a transversely extending pin (101), which is detachably secured to the two shank portions (113, 114) of the lifting hook.

18. A lifting hook as defined claim 1 wherein said anchoring member includes an eye portion (101a) made in one piece with upper ends of said two shank portions (113, 114).

* * * * *